July 14, 1953 — A. AMIRIKIAN — 2,645,114
HOLLOW STRUCTURE
Filed Oct. 18, 1945 — 7 Sheets-Sheet 1

Inventor
Arsham Amirikian
By [signature]
Attorney

Inventor
Arsham Amirikian
By [signature]
Attorney

July 14, 1953 A. AMIRIKIAN 2,645,114
HOLLOW STRUCTURE
Filed Oct. 18, 1945 7 Sheets-Sheet 5
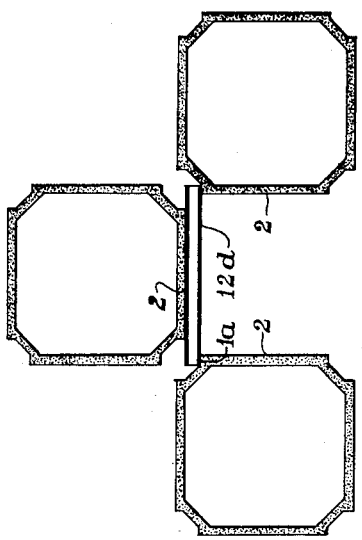
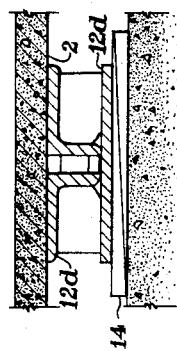
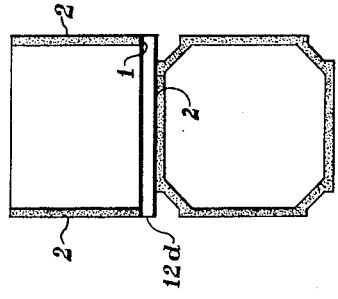
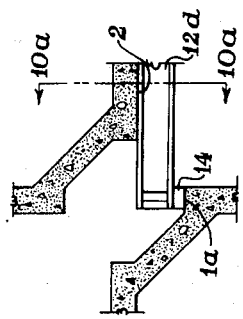
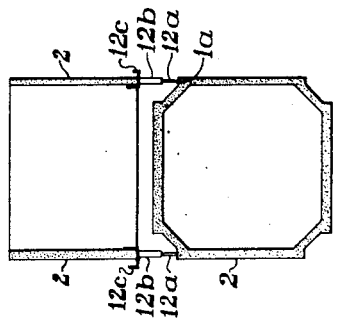
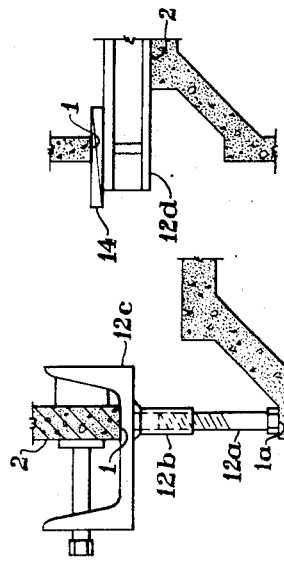
Inventor
*Arsham Amirikian*
By
Attorney Inventor
Arsham Amirikian July 14, 1953     A. AMIRIKIAN     2,645,114
HOLLOW STRUCTURE
Filed Oct. 18, 1945     7 Sheets-Sheet 7
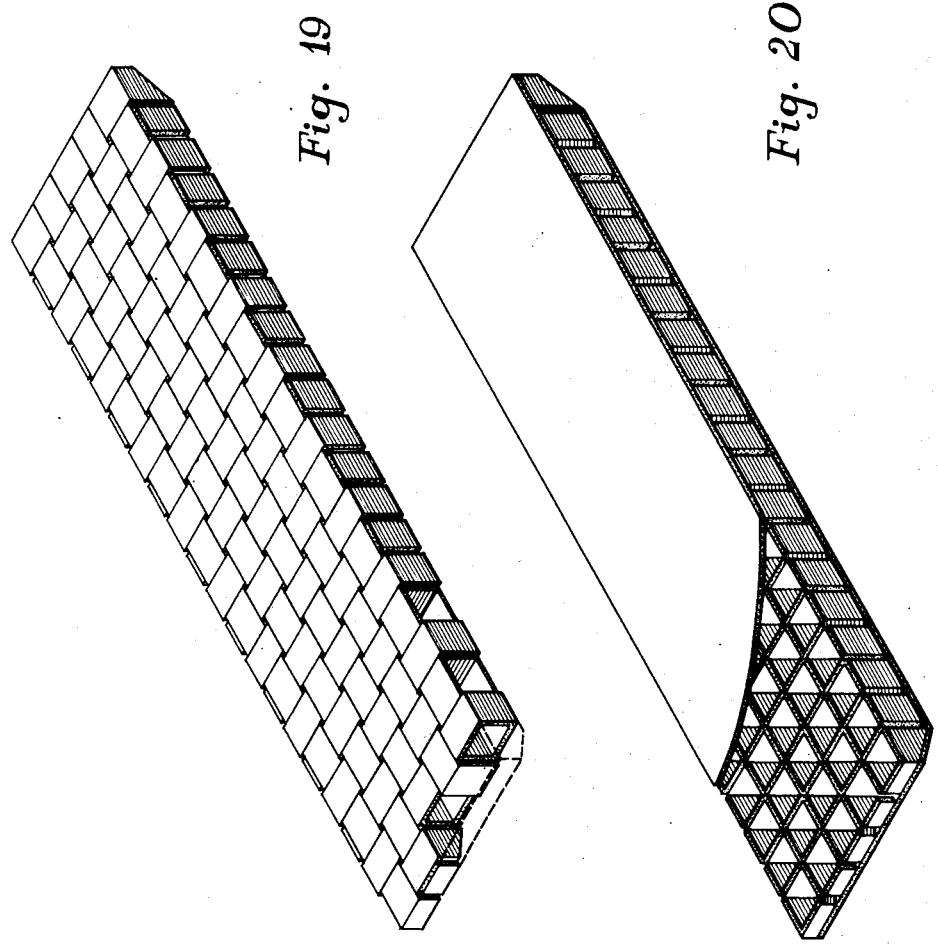
Inventor
Arsham Amirikian
By
Attorney Patented July 14, 1953

2,645,114

UNITED STATES PATENT OFFICE 2,645,114

HOLLOW STRUCTURE

Arsham Amirikian, Chevy Chase, Md.

Application October 18, 1945, Serial No. 623,160

6 Claims. (Cl. 72—42)

(Granted under Title 35, U. S. Code (1952), sec. 266)

The invention relates to a structural element and assembled structure and method of forming the same.

More particularly the invention relates to a reinforced concrete element and structural assembly and method of forming the same in which the component elements are pre-formed or pre-cast and arranged in various patterns to form the framing of a wide variety of floating and shore structures.

In present-day practice of reinforced concrete construction, all poured-in-place work in general and elements poured in the vertical position in particular, constitute an expensive, time consuming and often a difficult task. In poured-in-place work in general, it is not only necessary to design, erect, and remove elaborate container forms, shoring and special devices of support, but also to provide means of conveyance, handling, lifting, and placing of concrete from the mixing plant into the container forms. In the case of elements poured in the vertical position, additional requirements of pouring of concrete in relatively narrow spaces and the maintenance of over-all dimensions and thicknesses to insure against springing of forms under the head of poured green or fluid concrete, create further complications in construction and impose additional limitations on design.

An object of the invention is to eliminate altogether or to a great extent such poured-in-place work and to provide a structure comprising an assembly of structural elements which are pre-cast or pre-built and which may be produced by planned production as in the production of components of a factory.

Another object of the invention is to provide a structural element in the form of a thin-walled cellular prismatic box which will not only possess inherent stability during and in the assembly, but will also have great strength and light weight, such properties being assured by virtue of controlled pours and curing under ideal conditions. Since the boxes possess inherent stability, when setting in the final assembly of the framing they do not require bracing, shoring or other auxiliary devices to secure alignment and stability during assembly and jointing.

Another object of the invention is to reduce the form work to a mere fraction of that necessary for the conventionally poured section, by employing the same form in casting a great number of boxes.

Still another object of the invention is to utilize the pre-cast or pre-built elements in such arrangements as to provide a cellular framing for a variety of structures.

A further object of the invention is the provision of a structure comprising a plurality of boxes or cellular elements disposed adjacent to each other in spaced relationship, with binding or securing means between the corners and edges of the spaced boxes, the boxes being individually so shaped and being so arranged in adjacent relationship in the assembled structure as to form together with the binding or securing means continuous walls of single wall thickness extending in a plurality of directions.

Another object is to provide such a structure including boxes arranged in spaced side-wall-to-open end relationship.

Another object of the invention is to provide a structural assembly including boxes which are disposed diagonally adjacent each other and including a box having a wall portion in the plane of a wall portion of a box diagonally adjacent thereto, and forming portions of a wall of the assembly in the same plane and of single wall thickness.

Another object is to provide a structural assembly or assemblies utilizing a minimum number of elements or boxes.

In brief, the invention contemplates erecting a structure in the shortest period, utilizing the least amount of materials and labor, and at a cost considerably lower than that required by conventional methods of construction. Pre-casting elements assures all benefits of planned quantity production, with savings in time, cost of labor and materials of construction. The casting of the boxes independently materially advances the completion date of the structure as compared to the time required by methods of construction hitherto used.

Another object is the provision of a structural assembly comprising multiple layers of two different single layer arrangements of units or elements, the two different single layer arrangements being disposed alternately in the multiple layer assembly.

Other objects and advantages of the invention will become apparent from the following description having reference to the drawings which are exemplary and in which:

Figs. 5 to 10a show details of spacing means employed in assembling the boxes prior to connecting them in the structure.

Figure 14:
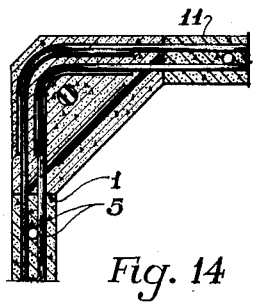
Figure 11:
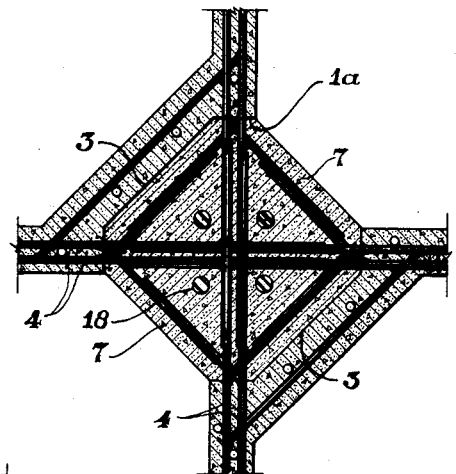
Figure 12:
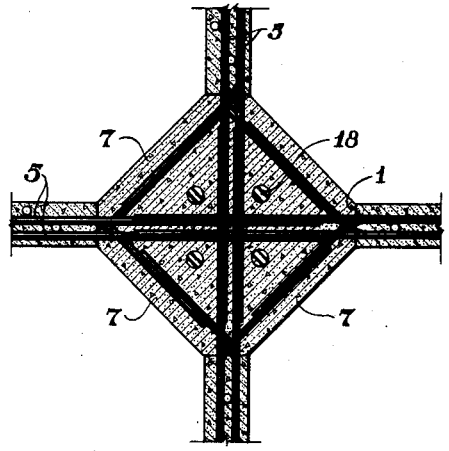
Figure 13:
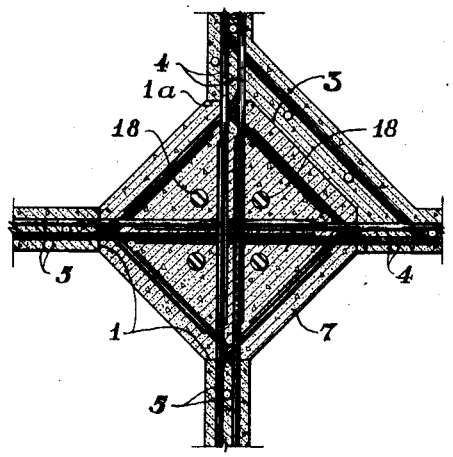
Figure 15:
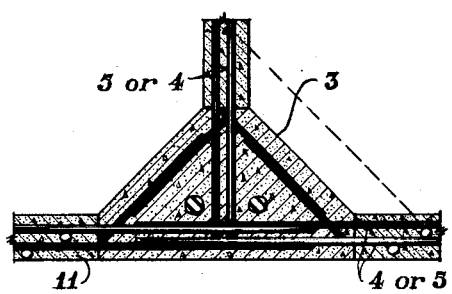

Figs. 11, 12, and 13 show details of interconnection of the elements or boxes, and Figs. 14 and 15 show further connections including connections to panels. Fig. 16 shows methods and means for pouring the joint of Fig. 12.

Figs. 17 and 18 show details of interconnection of the elements or boxes with poured-in-place concrete.

Fig. 19 is a view of a barge construction according to one arrangement of the invention. Fig. 20 is a diagrammatic view showing a similar barge construction according to another arrangement or assembly of the invention.

Referring to the drawings, the pre-built or pre-cast elements preferably comprise cellular substantially prismatic boxes with two open ends and having end edges or edge faces 1, the substantially hollow tubular boxes desirably being formed or cast in such a manner as to allow each of the sides or walls 2 to be poured in the flat or horizontal position. This may desirably be done by pre-casting the boxes, desirably of concrete or of plastic or other material, on a rotary collapsible form, enabling each of the sides or walls to be poured continuously, in succession, in a horizontal position. This positioned pouring, assures ease and control of operation, and enables casting of very thin sections of great strength. By use of thin sections, the dead weight and aggregates required for structural elements of comparable strength poured in the vertical position are reduced by as much as 60%.

In order to obtain the required strength as a stress carrying structural element, it is not practical to pour vertical walls of less than 5" thickness whereas a structural element can be cast in the horizontal position, and in accordance with the proposed technique as thin as ½".

The box is reinforced with preferably high tensile welded wire fabric. The four corners of the box preferably are shaped in the form of channel grooves 3 into or over which transverse reinforcing wires 4 project from the side edges 1a of the two adjacent faces or sides 2. In a similar manner longitudinal reinforcing wires 5 project from the end edges 1 of the box. The grooves 3 preferably extend throughout the full extent of the adjacent sides 2 of the box.

The structural element or cellular box is provided with corner wall portions 3 disposed between and joining the sides of the main side wall portions 2, the corner wall portions 3 being disposed inwardly of the line of intersection of the planes of the side wall portions 2 and extending throughout the full extent of the adjacent side walls 2, and these corner wall portions may desirably be in the form of grooves or channels. Preferably, the side walls 2 have four edge faces, with the corner wall portions 3 disposed between the adjacent sides of the side walls so as to leave exposed the side edge faces 1a at said adjacent sides, as seen in Fig. 1.

The boxes desirably are provided with openings 6 formed in any face or faces.

Figure 2:
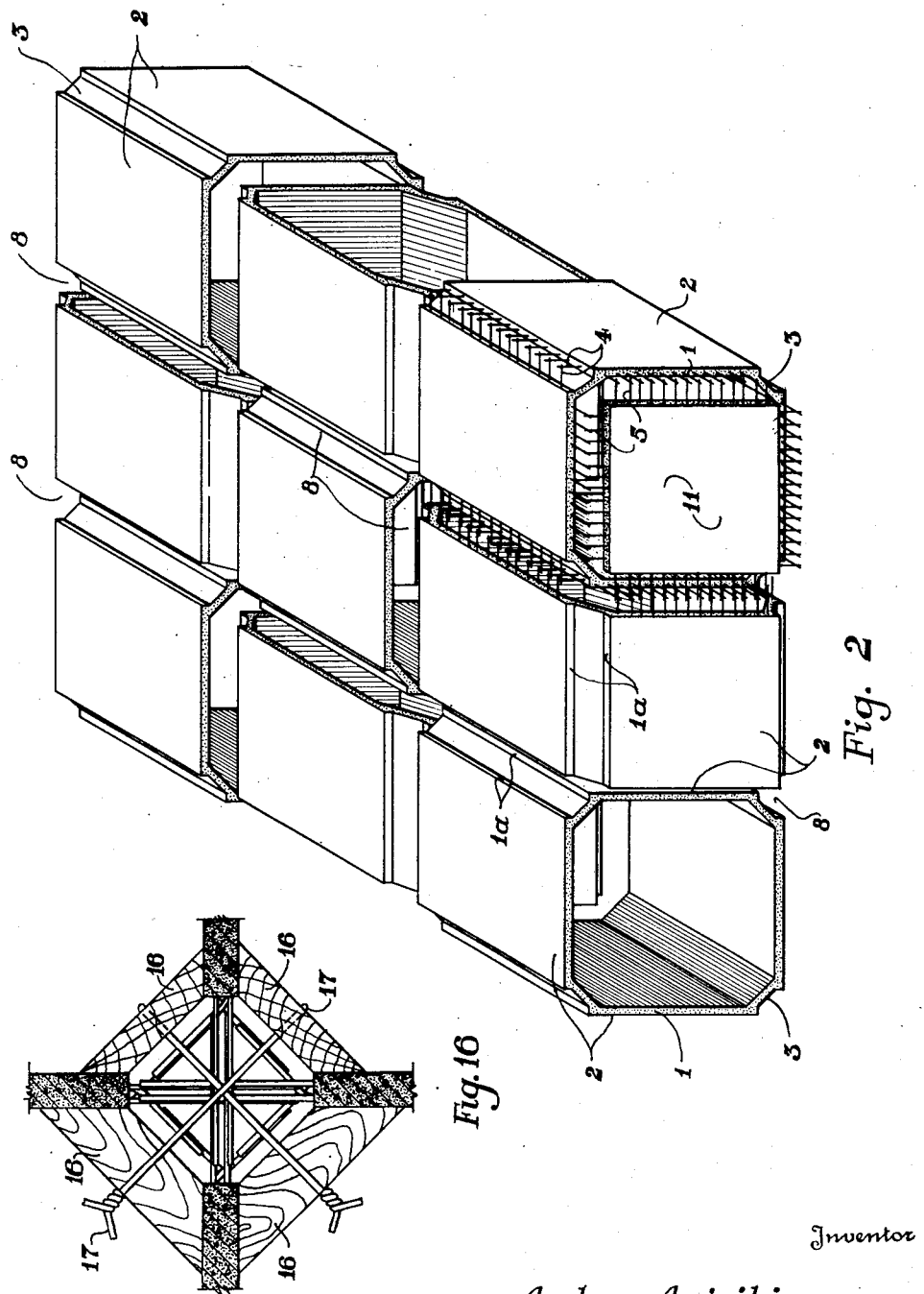
Fig. 2 is an isometric view of one arrangement of the boxes for a structural assembly, prior to completing the structure by joining the boxes.
Figure 4:
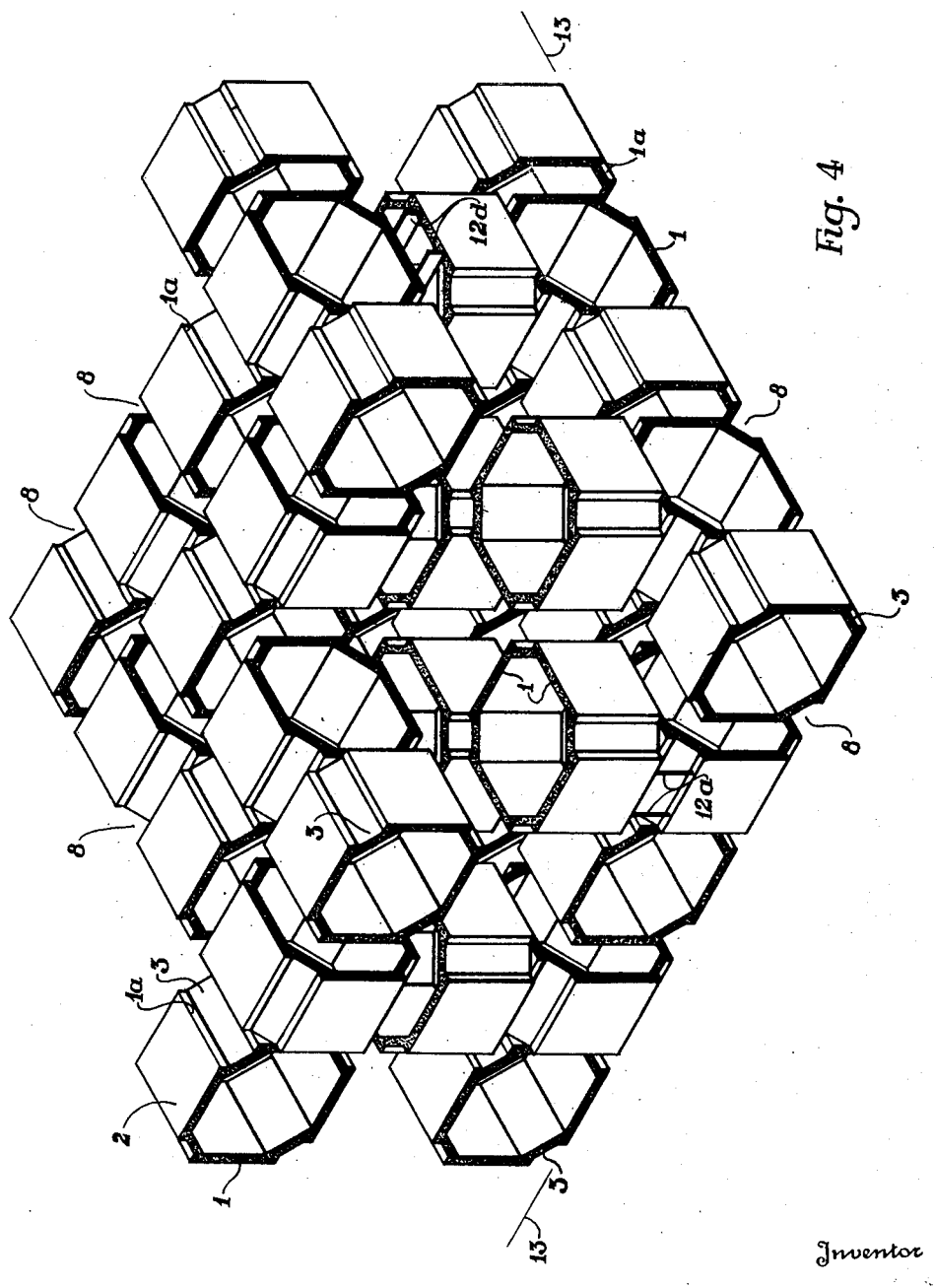
Fig. 4 is an isometric view partially showing an arrangement of the boxes for a multiple layer assembly or structure, prior to joining the boxes, reinforcing being omitted, and support or spacing means being shown in part only.

In assembling the pre-cast cellular elements or boxes, they are preferably so arranged in adjacent spaced relationship that the abutting sides or side walls 2 align into common planes comprising longitudinal and transverse vertical planes, and as in Figs. 2 and 4, horizontal planes at top and bottom, thus forming the walls, bulkheads, and floors of the structure. In other words, the boxes are individually so shaped and are so arranged in adjacent spaced relationship in the assembled structure, that their sides 2 form portions of continuous walls of single wall thickness extending in a plurality of directions or planes, when the boxes are joined or connected.

The boxes are each capable of being placed in the assembly to rest either on its side or end. The term side wall or wall of the box or element is intended to mean any side 2 thereof irrespective of whether the side or wall is horizontally or vertically disposed in the assembled structure.

Desirably the assembly according to the invention includes boxes which are disposed diagonally adjacent each other and including a box having a side wall portion 2 in the plane of a side wall portion 2 of a box diagonally adjacent thereto, and forming portions of a wall of the assembly in the same plane and of single wall thickness. This is a characteristic of the assemblies illustrated in Figs. 2, 3, and 4.

The walls of the structure include substantially rectangular interior walls each comprising a row of rectangular main side walls 2 of diagonally adjacent boxes disposed in rectilinear alignment side edge opposite to side edge and having a common central plane, with means connecting together the opposite side edges, some of said interior walls extending transversely to each other and intersecting, and each of said rectangular interior walls being substantially of the single wall thickness of its component aligned main side walls of the boxes. This provides lightness with strength in the structure.

The assemblies of Figs. 2 and 4 also include boxes or elements which are disposed laterally or rectilinearly adjacent to each other, and including a box having a side wall portion 2 in the plane of a side wall portion 2 of a box laterally or rectilinearly adjacent thereto, and forming portions of a wall of the assembly in the same plane and of single wall thickness.

The jointing between the various pre-cast elements, and thereby the common plane continuity between interconnecting wall segments or sides 2 of the cellular elements or boxes is accomplished by placing pressure grout or binding material 7 into the boundary grooves or spaces 8, formed by the edges and corners of the adjacent elements which are arranged in spaced relation, and into which grooves or spaces 8 projecting reinforcing steel wires 4 and 5 from the adjacent sides or corners extend to form a splice. Reinforcing strands or wires 4 preferably project from the side edges 1a of the sides 2, and reinforcing wires 5 project from the end edges 1 of the boxes.

Figure 3:
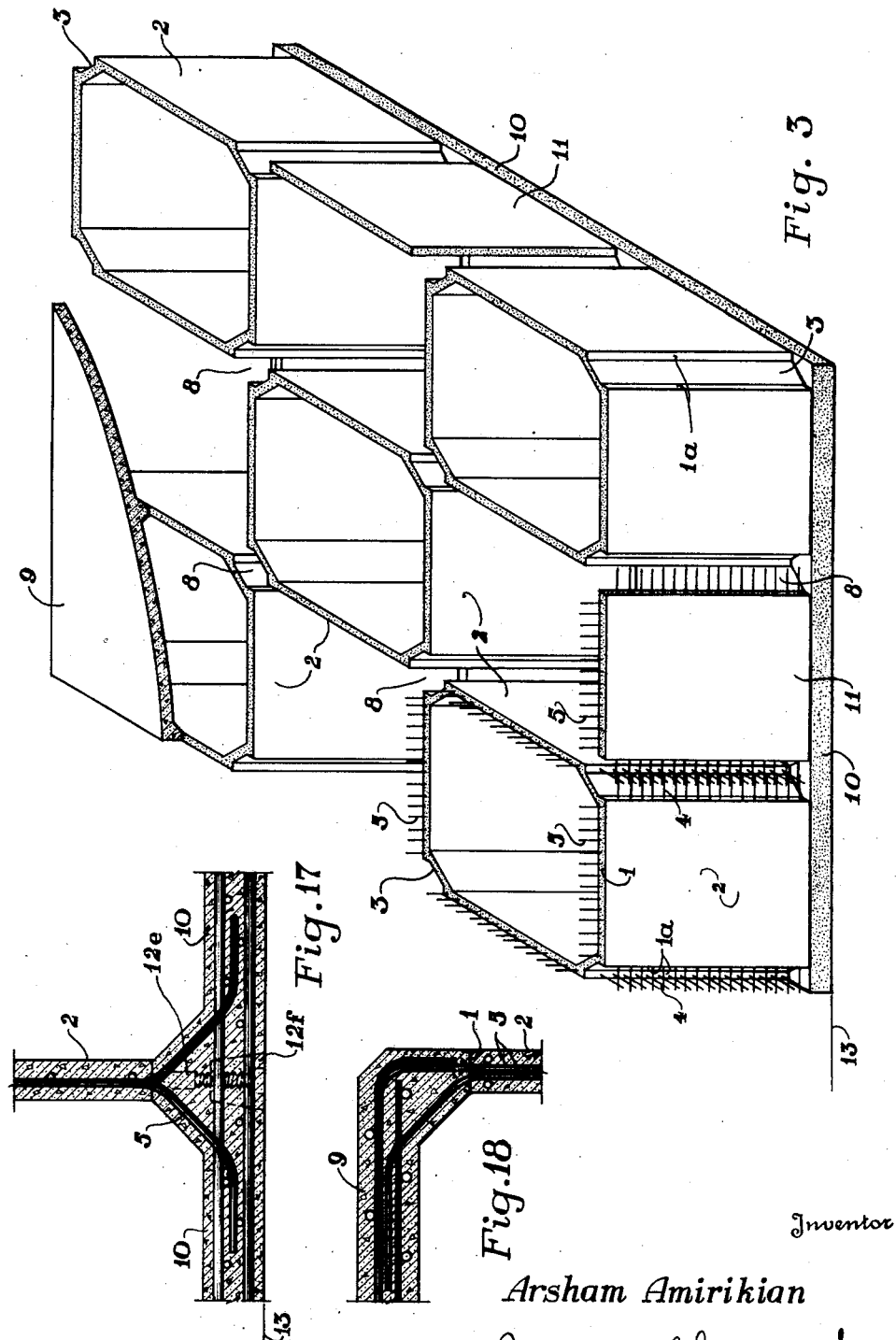
Fig. 3 is an isometric view showing another arrangement of the boxes.

The integration of pre-cast boxes in a cellular framing thus is readily provided according to the invention. As shown by the joint details in the drawings Figs. 11, 12 and 13, continuity between the wall segments of adjacent boxes is provided by lapping the protruding wires 4 and 5 and then pressure grouting the joints, while the jointing with the poured-in-place top and bottom slabs 9 and 10, such as in Fig. 3, is made as indicated in Figs. 17 and 18 by anchorage of wires 5 projecting from the ends of the boxes. The reinforcing material is preferably wire fabric. The high elastic yield value of the wire fabric enables the use of correspondingly higher tensile working stresses and balances the high compressive strength obtainable in pre-cast concrete.

In certain parts of the assembly, the pre-cast boxes are supplemented with pre-cast panels 11 in completing the outer walls of a given framing, as indicated.

In the isometric Fig. 3 all the boxes are placed on their ends in the assembly forming portions of continuous planes in two directions, namely, vertically in the transverse and longitudinal directions. The use of pre-cast panels is shown in Fig. 3, and there is also shown the use of top and bottom poured slabs.

Figures 1A, 1B, 1C:
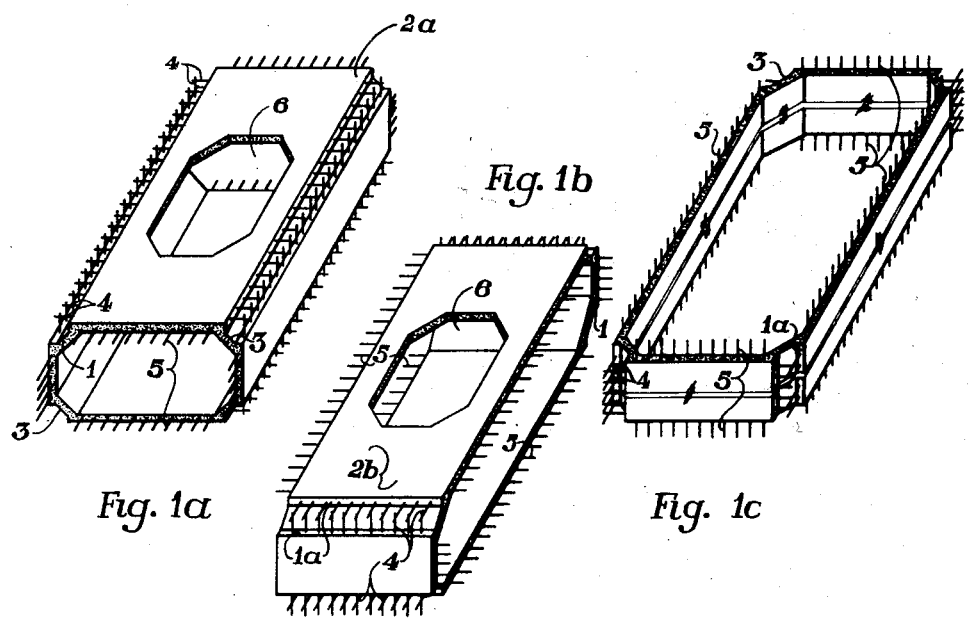
Figs. 1a, 1b, 1c are views showing cellular boxes or elements of different dimensions.
Figure 1:
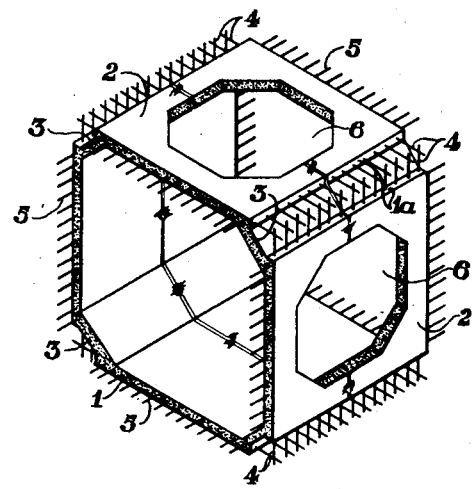
Fig. 1 is an isometric view of a structural element according to the invention.

The boxes in the arrangement of Fig. 3 may be of any suitable length or distance between their open ends and their open ends may be oblong as indicated in Figs. 1a, 1b and 1c, or substantially square as shown in Figs. 1 and 3. All of the boxes are of the same dimensions in the arrangement shown in Fig. 3.

In the isometric view Fig. 2 all of the cellular boxes are shown of the same dimensions, having all faces 2 alike in dimensions and being greater in overall dimension across their open ends than in length or distance between their open ends, as indicated in Fig. 1. In Fig. 2 the boxes are placed on their sides with laterally adjacent boxes at right angles to each other in sidewall-to-open-end relationship, and the boxes forming portions of continuous planes in three directions, namely, horizontally at top and bottom, and vertically in the transverse and longitudinal directions. In the isometric Figs. 1 and 2, the boxes are shown of the same overall dimension in either direction across their open ends. However, it will be apparent that an arrangement like Fig. 2 can also be made with two differently dimensioned types of boxes such as those of Figs. 1a and 1b, provided the greater overall dimension across the oblong open end of one type is greater than the length or distance between the open ends of the other type. In Figs. 1a and 1b, the depth or distance between the top and bottom or horizontal faces (2a in Fig. 1a and 2b in Fig. 1b) in both boxes is the same, and the distance between the vertical faces of one box is greater than the length or distance between the open ends of the other box, the difference varying in accordance with the desired joint gap or opening 8.

The layer of boxes in Fig. 2, while shown in a horizontal assembly can be disposed vertically, if desired. As indicated in Figs. 2 and 3, panels 11 may be used to close the end openings.

In the multiple layer assembly of Fig. 4, the assembly is attained by superposing the single layers of boxes shown in Figs. 2 and 3 in alternating sequence, with suitable supporting or spacing means between the boxes, as partially indicated in Fig. 4.

It is apparent from the assembly of Fig. 4, that the sides of the boxes in the assembly form portions of continuous walls of single wall thickness disposed in the assembly in planes in three directions, i. e. vertical planes at right angles to each other and horizontal planes.

Also, as is apparent from Fig. 4, all of the boxes in the assembly are disposed in open-end-to-side-wall relationship with the boxes rectilinearly adjacent thereto, vertically or horizontally in the assembly.

It will be further apparent that the boxes at the sides of the assembly of Fig. 4 form vertically disposed layers or tiers in certain patterns.

The pattern or arrangement of the boxes viewed from the left side of the assembly of Fig. 4, comprises a vertically disposed layer or tier in which the alternate vertical rows of boxes simulate the positions of the boxes as in Figs. 2 and 3, and this vertically disposed layer or tier thus is, in effect, a combination of the arrangements of Figs. 2 and 3 not only in its horizontal rows of boxes but also in its vertical rows of boxes.

The next adjacent vertical layer or tier is the same as that viewed from the left of Fig. 4. This second vertical layer from the left of Fig. 4, however, is staggered or offset laterally in the assembly a distance of one row or unit in respect to the first-described vertical layer.

The third vertical layer or tier of boxes from the left of Fig. 4 is placed the same as the first described vertical layer.

Thus the assembly of Fig. 4 as viewed from the left comprises a plurality of identical vertical layers or tiers in alternately staggered or offset relationship.

It will be apparent that the single vertical layer assembly at the left of Fig. 4 may be disposed horizontally instead of vertically, and the like succeeding layers placed thereon, in the alternately staggered or offset relation described.

The assembly of Fig. 4 may be composed of boxes all of which are of the same dimensions, or it may be composed of boxes of different dimensions, such as indicated in Figs. 1a, 1b and 1c. Also the length or distance between the open ends of the boxes in the layers of Fig. 4 which correspond to Fig. 3, may be varied as may be desired.

The pattern or arrangement of the boxes viewed from the right side of Fig. 4 comprises a vertically disposed layer or tier in still another different combination of boxes in the layer or tier, and succeeding vertical layers or tiers are the same as the first except that they are alternately laterally offset, a distance of one row or unit. It will be also apparent that this arrangement can be placed horizontally instead of vertically, if desired.

A suitable level surface or erection platform 13 supports the boxes and the assembly.

The support or spacing means may be of any suitable type to support the boxes in the assembly in spaced relation to each other, and which support or spacing means may be removed upon completion of the joint including the grout or binding material.

Suitable types of support means are indicated in Figs. 5 to 10a. The support means are preferably capable of engaging the edge faces 1 and 1a of the walls 2 of the boxes or elements. In Figs. 5 and 6 there is shown support or spacing means in the form of a threaded stud 12a and bearing member 12b. The bearing member 12b may desirably be provided with clamping means 12c when it is desired to clamp the edge 1 of a box as seen in Figs. 5 and 6. In Figs. 7 to 10a there is shown support or spacing means in the form of bars or beam members 12d of a length and thickness to engage the surfaces of the adjacent boxes in an assembly and to space them the desired amount. The bars 12d may engage the sides 2, end edges 1, or side edges or shoulders 1a as shown in the several views. Preferably wedge means 14 are disposed between the bars 12d and the surfaces of the boxes, as indicated. The wedges 14 and bars 12d are removed after completing the joints between the boxes with binding material or grouting.

In Fig. 17 there is shown support or spacing means in the form of threaded studs 12e cast in the end edges 1 of side walls 2 with a removable plug 12f at the projecting end. The plug or nut 12f may be removed subsequent to the pouring and the hole may be filled with grout.

The connection between the boxes shown in Fig. 11 represents a section of a completed joint between two of the boxes of Fig. 3 which are adjacent cornerwise.

The connection shown in Fig. 12 is a section through a joint between four boxes abutting edgewise as in Fig. 2.

The connection shown in Fig. 13 is a section of a joint between three adjoining boxes as in any of the vertically disposed groups of boxes in Fig. 4, and showing the connection between the corner of one box and one edge each of the other two boxes.

The detail shown in Fig. 14 is a section through a joint between a box and a precast panel 11 as in Fig. 2, showing the connection between the edge 1 of the box and the panel.

The detail shown in Fig. 15 is a section representing either a joint between a box and a panel as in Fig. 3 and showing the connection between the corner of the box and the edge of the panel, or a section of a joint between two boxes and a panel as in Fig. 2 and showing the connection between the edges of the boxes and the panel.

The construction of a structure in accordance with the invention involves the following steps:

(a) The casting of the pre-cast elements, in conformity with the requirements of design, framing and handling as regards the strength, shape and mass. The elements may be cast either at a plant and then transported to the site or cast directly at the site of construction.

(b) The setting up or the assembling of the elements. In the case of all-precast construction, the bottom or first layer of the elements or boxes is set on an erection platform or level surface, the elements being so arranged as to provide the desired gap 8 for grouting, and alignment and orientation of framing planes as indicated in Figs. 2 and 3. Subsequent layers are then similarly set on top of the first assembled layer, as in Fig. 4, for example, the desired gap for jointing being maintained as by the threaded stud 12a and bearing member 12b, or by use of jacks and other similarly adjustable supporting devices. In the case of a construction involving the use of precast elements and poured-in-place concrete, such as shown in Figs. 3 and 17, the reinforcing 15 of the bottom slab 10 is first laid on the erection platform or level surface; then the precast boxes and panels 11 are set and aligned as above, preferably utilizing threaded studs 12e and removable plugs 12f. The protruding reinforcing 5 of the precast elements is then bent to conform with the wedge-shaped outline of the junction fillet, and then the concrete is poured to complete the operation. The pouring of the top slab 9 is accomplished in a similar manner.

(c) The grouting of the joints. After the precast elements are set and aligned as described above, the protruding reinforcing 4 and 5 of the elements at each joint is arranged in accordance with the details shown in Figs. 11 to 15. As will be noted, a part of the reinforcing is kept straight to form a lapped splice while another part is bent to serve as the reinforcing of the connection groove. Figs. 14 and 15 respectively show a typical edge joint as used to connect the end edge 1 of a box to a panel 11 as in Fig. 2, and a joint between a box corner and a panel 11 as in Fig. 3 or a joint between a panel 11 and two box edges as in Fig. 2. Forms 16 are applied as indicated, for example, in Fig. 16 and pressure grout 7 is deposited to complete the joint. The forms 16 may be inserted and removed through the openings in the sides of the boxes. Or the forms may be permitted to remain in place after grouting, if desired, as they are of light weight. The forms are preferably held by wire ties 17 during use. Whenever required, additional reinforcing may be provided for added strength in longitudinal, transverse and vertical directions in the form of wires or bars 18 placed in the center of the connection grooves or spaces.

While the invention is particularly applicable to floating structures such as a barge, pontoon or other floating structure, it is understood that the invention is not limited to floating structures but is adaptable to various types of shore structures, and is limited only by the scope of the appended claims.

In the constructions diagrammatically illustrated in Figs. 19 and 20, a barge or lighter is shown embodying the invention. In the many and various constructions which may embody the invention, the boxes may be made of any suitable size and dimensions, in accordance with the invention. In the construction of a barge or lighter, for example, boxes over six feet in length with a wall thickness of 1½ inches and having large openings which provide doors in the walls, may be employed.

Modifications may be made within the scope of the invention such as casting the box in forms other than rectangular, or having either top or bottom closed, or one or more sides omitted, and it will be understood that various changes in the size, shape, and arrangement of parts may be made without departing from the spirit of the invention which is not to be limited other than by the terms of the appended claims.

The invention described herein may be manufactured and used by or for the Government of the United States of America for governmental purposes without the payment of any royalties thereon or therefor.

What is claimed is:

1. In a structure comprising a plurality of substantially hollow tubular boxes of the same dimensions and each having four rectangular main side walls, with said plurality of boxes being disposed in a group in a common plane with means connecting them together, and said plurality of hollow tubular boxes including boxes which are disposed diagonally adjacent to each other in said group, said structure having a substantially rectangular interior wall extending therethrough and comprising a row of rectangular main side walls of diagonally adjacent boxes disposed in rectilinear alignment side edge opposite to side edge and having a common central plane, said connecting means connecting together said opposite side edges of said rectilinearly aligned rectangular main side walls of said row, said structure having a second substantially rectangular interior wall extending therethrough transversely to and intersecting said first-mentioned rectangular interior wall of the structure and comprising a second row of rectangular main side walls of diagonally adjacent boxes disposed in rectilinear alignment side edge opposite to side edge and having a common central plane, said connecting means connecting together said opposite side edges of said rectilinearly aligned rectangular main side walls of said second row, said mutually transverse intersecting substantially rectangular interior walls of the structure each being substantially of the single wall thickness of its component aligned main side walls of the boxes and providing lightness with strength in the structure.

2. A structure according to claim 1 having a plurality of said first-mentioned rectangular walls of the structure in parallel relation to each other and a plurality of said second rectangular walls of the structure in parallel relation to each other and extending transversely to and intersecting said first-mentioned rectangular walls of the structure.

3. In a structure comprising a plurality of substantially hollow tubular boxes of the same dimensions and each having four rectangular main side walls, with said plurality of boxes being disposed in a group in a common plane with means connecting them together, said hollow tubular boxes having initially open ends and each being disposed in rectilinearly adjacent relation to another of said boxes in said group, said rectilinearly adjacent boxes being disposed in open end to side wall relationship, said boxes each having a greater overall dimension between said main side walls thereof than the length of the box between its ends, said plurality of hollow tubular boxes including boxes which are disposed diagonally adjacent to each other in said group, said structure having a substantially rectangular interior wall extending therethrough and comprising a row of rectangular main side walls of diagonally adjacent boxes disposed in rectilinear alignment side edge opposite to side edge and having a common central plane, said connecting means connecting together said opposite side edges of said rectilinearly aligned rectangular main side walls of said row, said structure having a second substantially rectangular interior wall extending therethrough transversely to and intersecting said first-mentioned rectangular interior wall of the structure and comprising a second row of rectangular main side walls of diagonally adjacent boxes disposed in rectilinear alignment side edge opposite to side edge and having a common central plane, said connecting means connecting together said opposite side edges of said rectilinearly aligned rectangular main side walls of said second row, said mutually transverse intersecting substantially rectangular interior walls of the structure each being substantially of the single wall thickness of its component aligned main side walls of the boxes and providing lightness with strength in the structure.

4. In a structure comprising a plurality of substantially hollow tubular boxes of the same dimensions and each having four substantially flat rectangular main side walls and four corner walls each disposed between adjacent sides of two of said main side walls, said corner walls each being disposed inwardly of the line of intersection of the planes of the exterior faces of the adjacent said main side walls, said plurality of hollow tubular boxes being disposed in a group with their ends in substantially parallel planes, each of said plurality of boxes being disposed in diagonally adjacent relation to another of said boxes of said group with their adjacent corner walls being disposed opposite to each other, means connecting together said plurality of diagonally adjacent boxes of said group at their adjacent opposite corner walls, said structure having a substantially rectangular interior wall extending therethrough and comprising a row of rectangular main side walls of diagonally adjacent boxes disposed in rectilinear alignment side edge opposite to side edge and having a common central plane, said connecting means connecting together said opposite side edges of said rectilinearly aligned rectangular main side walls of said row, said structure having a second substantially rectangular interior wall extending therethrough transversely to and intersecting said first-mentioned rectangular interior wall of the structure and comprising a second row of rectangular main side walls of diagonally adjacent boxes disposed in rectilinear alignment side edge opposite to side edge and having a common central plane, said connecting means connecting together said opposite side edges of said rectilinearly aligned rectangular main side walls of said second row, said mutually transverse intersecting substantially rectangular interior walls of the structure each being substantially of the single wall thickness of its component aligned main side walls of the boxes and providing lightness with strength in the structure.

5. In a structure according to claim 4, each one of a pair of said diagonally adjacent boxes having contiguous said rectangular main side walls thereof respectively in rectilinear alignment with contiguous said rectangular main side walls of the other box of said pair, and forming portions of said rectangular interior walls of the structure which extend transversely to and intersect each other.

6. In a structure according to claim 4, each one of a pair of said diagonally adjacent boxes having contiguous said rectangular main side walls thereof respectively in rectilinear alignment with contiguous said rectangular main side walls of the other box of said pair, and forming portions of said rectangular interior walls of the structure extending transversely to each other, said corner walls between contiguous said rectangular main side walls of each of said boxes being in the form of channels providing exposed side edge faces of said rectangular main side walls, said connecting means comprising grouting material and reinforcing means in said main side walls comprising reinforcing strands projecting from the side edge faces of said contiguous main side walls and overlying said corner walls and substantially crossing thereover, the crossed reinforcing strands of each one of a pair of said diagonally adjacent boxes being respectively substantially in alignment and intermeshing with the crossed reinforcing strands of the other box of said pair.

ARSHAM AMIRIKIAN.

References Cited in the file of this patent
UNITED STATES PATENTS

| Number | Name | Date |
| --- | --- | --- |
| 672,176 | Melber | Apr. 16, 1901 |
| 973,165 | Cahill | Oct. 18, 1910 |
| 1,086,177 | Hultquist | Feb. 3, 1914 |

(Other references on following page)

UNITED STATES PATENTS

| Number | Name | Date |
|---|---|---|
| 1,326,400 | Halverson et al. | Dec. 30, 1919 |
| 1,409,984 | Whitacre | Mar. 21, 1922 |
| 1,412,113 | Hermoye et al. | Apr. 11, 1922 |
| 1,446,681 | Wire | Feb. 27, 1923 |
| 1,553,858 | Heath | Sept. 15, 1925 |
| 1,749,204 | Wood et al. | Mar. 4, 1930 |
| 1,749,524 | Barbato | Mar. 4, 1930 |
| 1,964,899 | Wolf | July 3, 1934 |
| 2,217,675 | Deuel | Oct. 15, 1940 |
| 2,337,743 | Deuel | Dec. 28, 1943 |
| 2,341,008 | Yourkevitch | Feb. 8, 1944 |

FOREIGN PATENTS

| Number | Country | Date |
|---|---|---|
| 57,163 | Austria | of 1913 |
| 122,586 | Great Britain | of 1919 |
| 508,492 | France | of 1920 |
| 249,824 | Italy | of 1926 |
| 649,415 | France | Dec. 21, 1928 |
| 702,445 | France | Jan. 26, 1931 |
| 754,106 | France | of 1933 |
| 44,299 | France | of 1934 |
| 644,586 | Germany | of 1937 |
| 371,926 | Italy | of 1939 |
| 380,760 | Italy | of 1940 |